United States Patent [19]

Buck et al.

[11] 3,742,155

[45] June 26, 1973

[54] CALL SOURCE VERIFICATION ARRANGEMENT

[75] Inventors: Robert Grainger Buck, Farmington, Mich.; John Joseph Deltuvia, Sr., Jackson, N.J.; Albert Hunter Spinks, Burlington, N.C.

[73] Assignees: American Telephone and Telegraph Company, New York, N.Y. ; by said Buck; Bell Telephone Laboratories, Incorporated, Murray Hill, N.J. ; by said Deltuvia and Spinks

[22] Filed: Feb. 1, 1972

[21] Appl. No.: 222,521

[52] U.S. Cl. .......... 179/175.3
[51] Int. Cl. .......... H04b 3/46
[58] Field of Search .......... 179/175.31 R, 175.3, 179/175.2 R, 18 GF; 324/52

[56] References Cited

UNITED STATES PATENTS 3,531,773 9/1970 Beebe .......... 179/18 GF
3,662,125 5/1972 Haas .......... 179/175.2 R

*Primary Examiner*—Kathleen H. Claffy
*Assistant Examiner*—Douglas W. Olms
*Attorney*—R. J. Guenther et al.

[57] ABSTRACT

An arrangement is disclosed for verifying that requests for a loop-around type test connection between two calling stations have originated from appropriate stations which are physically at the same location. Location verifying signals resulting from a series of one syllable words being spoken simultaneously into transducer elements of both calling stations are sensed and counted by a test circuit at the point of requested loop-around connection. Reception of a specified number of substantially simultaneous signals from both stations within a measured time period initiates establishment of the requested connection.

17 Claims, 4 Drawing Figures

PATENTED JUN 26 1973 3,742,155

SHEET 3 OF 3

CALL SOURCE VERIFICATION ARRANGEMENT

BACKGROUND OF THE INVENTION

Our invention relates generally to arrangements for interconnecting communication channels and, more particularly, to arrangements for verifying that requests for channel interconnection have originated from appropriately related and located sources.

Transmission testing of a communication channel between communication switching centers by switching center maintenance personnel has been accomplished in the past through a looped transmission path which includes the channel under test and another channel. The two channels are connected to transmission test equipment at one switching center and are interconnected, under control of maintenance personnel at the one switching center, by means of a loop-around connection arrangement located at a remote switching center. A channel transmission test signal thus can be transmitted from and received by test equipment at one testing location. Such a channel transmission testing facility is described in U.S. Pat. No. 3,371,165 of H. W. Earle et al., which issued on Feb. 27, 1968.

In the past, access to remotely located loop-around connection arrangements generally has been limited to switching center maintenance personnel who are responsible for the maintenance of communication channels from the switching center. Since many different types and makes of communication terminal equipment are now being designed, installed, and maintained by customers located outside of any communication switching center, it would be advantageous for such a customer to have access through a switching network to remotely located loop-around connection arrangements in order that the customer's communication terminal equipment can be tested by him for proper performance under standard operational conditions.

If a remote loop-around connection circuit is inadvertently accessed by unrelated customers at unrelated terminal test locations, erroneous test results would be encountered, since the test signals transmitted from one test location would be monitored and analyzed by unrelated test equipment at a different test location. In this event, there would be no meaningful correlation between the test signals transmitted and the signals received for analysis. Therefore, in order to avoid inadvertent connections between nonrelated terminal test equipments and the ensuing meaningless test results, it should be assured that requests received by a loop-around connection arrangement for the interconnection of communication channels have originated from appropriately related and located sources.

An object of our invention is to insure that test communications transmitted through a loop-around connection arrangement are received by the proper equipment and are not monitored inadvertently by some unrelated equipment.

A further object of our invention is to prevent the interconnection by a loop-around connection arrangement of communication channels established from unrelated terminal equipments.

Another object of our invention is to verify that requests for a loop-around connection between communication channels have been originated from properly related sources at the same physical location.

SUMMARY OF THE INVENTION

The above and other objects of our invention are achieved in accordance with the principles of our invention by means of a signal pattern test circuit associated with a loop-around connection circuit. The test circuit monitors the communication channels whose interconnection has been requested. If a predetermined pattern of verification input signals is detected on both channels within a predetermined time period, the test circuit enables the loop-around circuit to interconnect the channels. Otherwise, no loop-around connection is made.

One illustrative such pattern of signals comprises a predetermined number of occurrences of simultaneous input signals on both channels. If this signal pattern is used, as in the illustrative embodiment of our invention described herein, when more than a limited number of input signals are detected on either of the channels during a measured time period, or when less than the predetermined number of simultaneous input signal occurrences are detected on both channels during a smaller time interval within the measured time period, the test circuit is arranged to provide an indication that no interconnection of channels will be made by the loop-around circuit.

In the illustrative embodiment of our invention described herein, a pattern of coincident signal occurrences on both channels is generated by the customer's speaking of a predetermined number of one syllable words simultaneously into transducer elements connected to the respective channels whose interconnection he has requested.

In accordance with a feature of our invention, a connection between communication channels is established in response to the detection of a predetermined signal pattern on all the channels, e.g., occurrence of substantially simultaneous input signals on all the channels.

In accordance with another feature of our invention, interconnection of communication channels is accomplished only if a predetermined number of occurrences of substantially simultaneous input signals on all the channels is detected within a predetermined time period.

In accordance with a further feature of our invention, establishment of a connection between communication channels is inhibited when more than a limited number of input signals is detected on any of the channels.

DESCRIPTION OF THE DRAWING

The above and other objects and features of our invention will be more readily understood from the following detailed description when read in conjunction with the drawing, in which.

DETAILED DESCRIPTION

Figure 1:
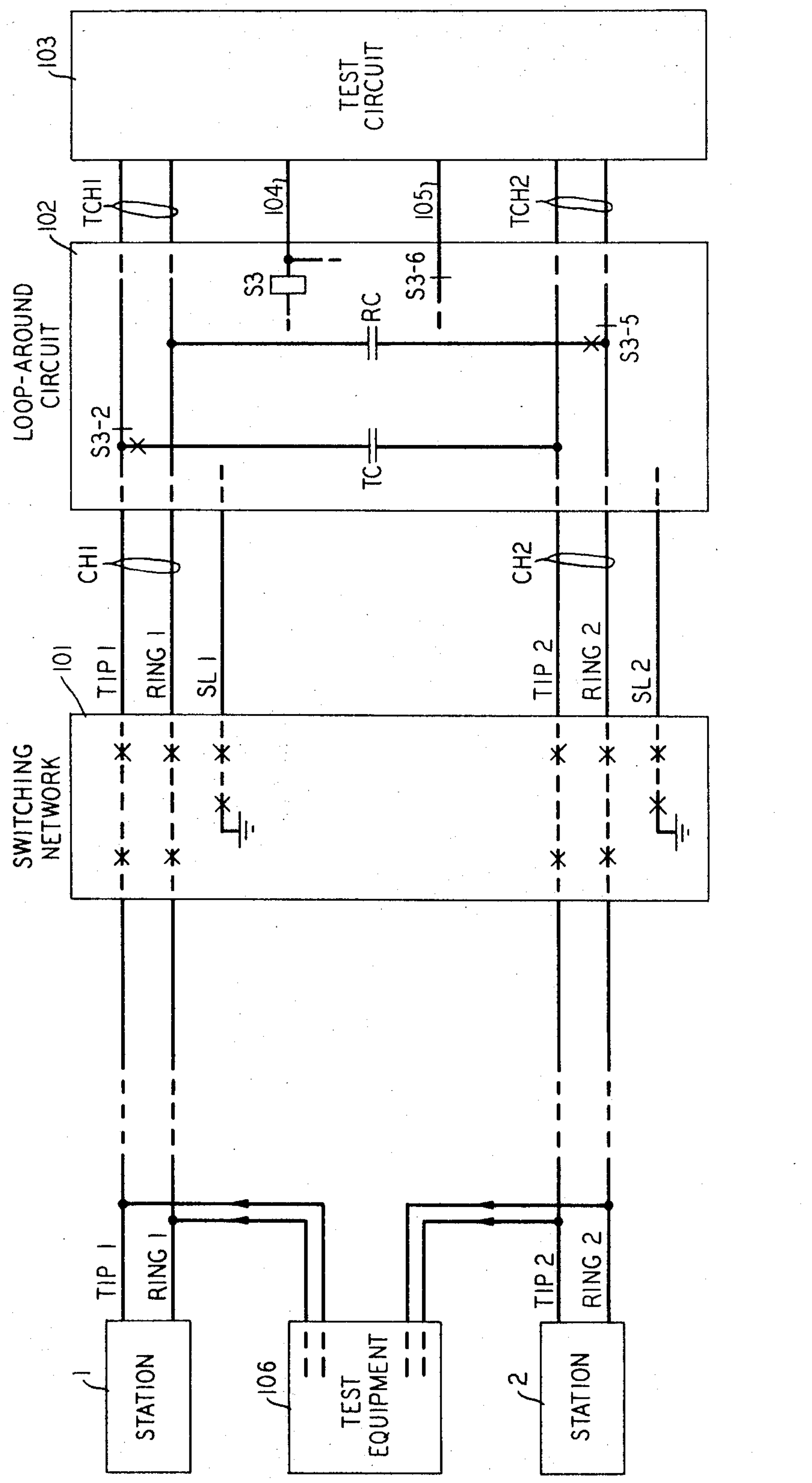
FIG. 1 is a block diagram illustrating the principles of our invention in the context of a communication switching system.

FIG. 1 shows a pair of communication stations 1 and 2 respectively connected to a communication switching network 101; communication terminal test equipment 106 associated with both stations 1 and 2; a loop-around circuit 102 connected at two separate points to switching network 101; and an input signal pattern test circuit 103 connected with loop-around circuit 102.

Stations 1 and 2, in this illustrative embodiment, comprise standard telephone station instruments. Switching network 101 represents a switching system comprising one or more switching centers through which connections can be made in order to establish communication channels from stations 1 and 2 to loop-around circuit 102. Both stations 1 and 2 can, by outpulsing the appropriate digits assigned to the respective network terminations of loop-around circuit 102, cause network 101 to set up connections from the respective stations 1 and 2 to the respective network terminations of loop-around circuit 102. The equipment and operations involved in the establishment of such connections through switching networks are well known and will not be described herein. The two communication channels CH1 and CH2 thereby established from stations 1 and 2 to loop-around circuit 102 are respectively represented in FIG. 1 by conductors TIP1, RING1, and TIP2, RING2. These channels CH1 and CH2 are respectively extended through loop-around circuit 102 by means of normal contacts S3-2 and S3-5 of relay S3 to test channels TCH1 and TCH2 which are connected to test circuit 103. Power for operating test circuit 103 is supplied over conductor 105 through normal contact S3-6 of relay S3.

Test circuit 103 can now monitor all input signals appearing on either of the communication channels CH1 and CH2 over test channels TCH1 and TCH2. When a specific predetermined pattern of input signals on channels CH1 add CH2 has been detected by test circuit 103, relay S3 is operated by test circuit 103 over conductor 104. Operation of relay S3 disconnects the communication channels CH1 and CH2 from test circuit 103 at contacts S3-2 and S3-5, disconnects power from test circuit 103 at contact S3-6, and establishes a loop-around connection between channels CH1 and CH2 through operated contacts S3-2 and S3-5. Test equipment 106 can now be employed to transmit, receive, and analyze test communication signals over channels CH1 and CH2 and the established loop-around connection therebetween.

Operation of Loop-Around Circuit 102

Signal Pattern Test Connection

Figure 2:
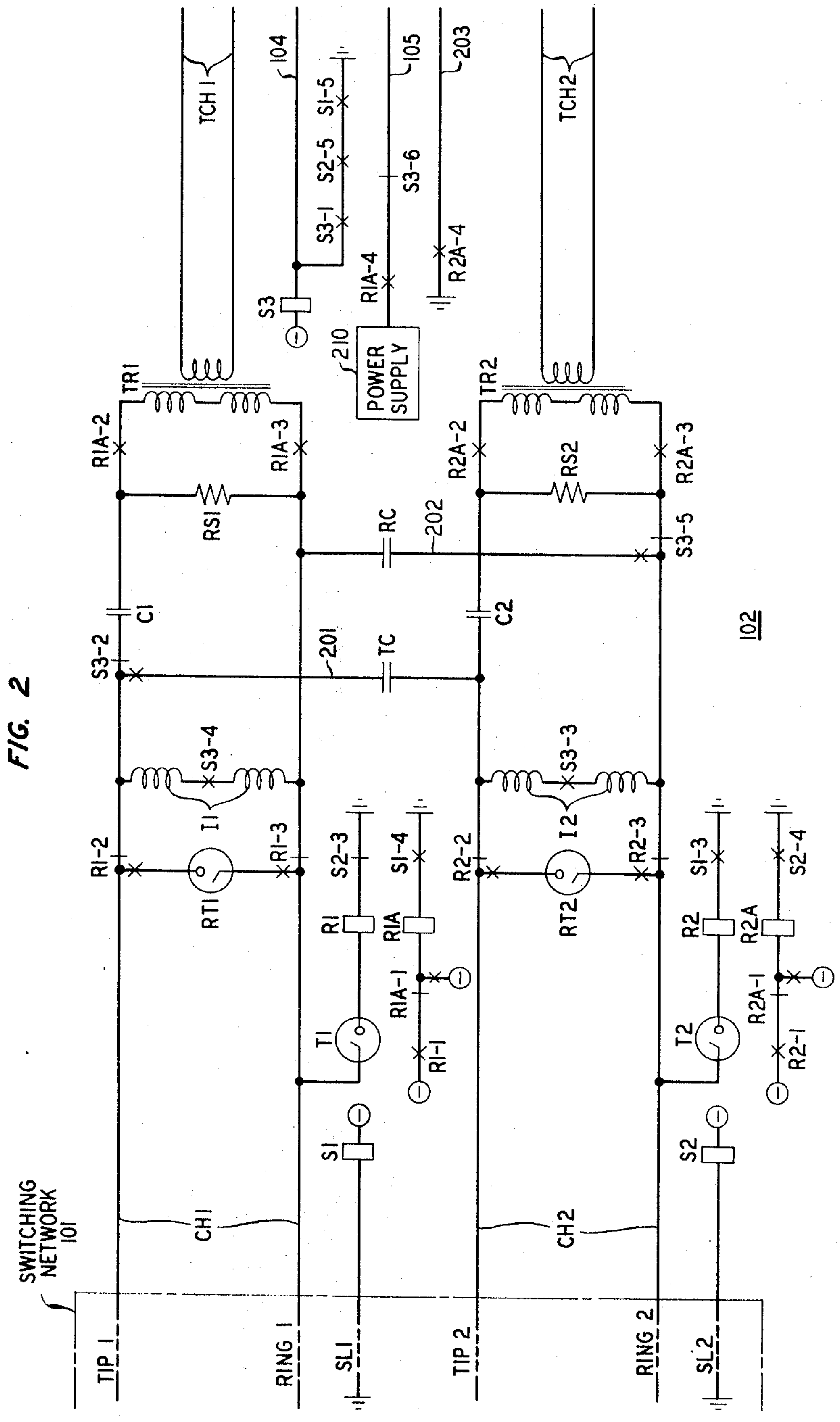
FIG. 2 is a schematic representation of an illustrative loop-around circuit.

FIG. 2 is a schematic representation of an illustrative loop-around circuit which can be controlled in accordance with the principles of our invention. As is well known in the communications switching art, when a network connection is established to a called network termination, ground potential is applied by the network to a sleeve conductor associated with the called network termination. Thus, each of the two network terminations of loop-around circuit 102 has associated therewith a sleeve conductor SL1, SL2 to which network 101 applies ground potential when a connection is established to the associated network termination. The functions of sleeve conductors are well known in the communication switching art and will not be further described herein.

As will be seen from the following description, the normal operation of loop-around circuit 102 requires that communication channel CH1 be established prior to the establishment of channel CH2. When network 101 establishes channel CH1, ground potential is placed by network 101 on sleeve conductor SL1 in the usual manner. This ground potential causes the operation of relay S1. Relay S1 is held in an operated condition until the ground potential on sleeve conductor SL1 is removed by network 101.

As is well known in the communications art, following the establishment of a network connection to a called network termination, loop current is supplied to the termination by application of negative potential to one conductor thereof and ground potential to the other conductor thereof, and ringing current is applied by the network to the called network termination. Thus, ringing current and loop current potentials are applied to channel CH1 in the usual manner by network 101. Application of ringing current to channel CH1 causes tube T1 to ionize and relay R1 to operate. The operating path for relay R1 extends from ground potential through normal contact S2-3 of relay S2, the winding of relay R1, and tube T1 to negative potential on conductor RING1. Inclusion of normal contact S2-3 in this operating path inhibits operation of relay R1 if a network connection already has been made for channel CH2 and relay S2 already has been operated.

Operation of relay R1 provides an operating circuit for relay R1A which extends through operated contact R1-1 of relay R1, normal contacts R1A-1 of relay R1A, the winding of relay R1A, and operated contact S1-4 of relay S1. Relay R1A is held in an operated condition over a circuit including operated contact S1-4 of relay S1 and operated contacts R1A-1 of relay R1A.

Operation of relay R1 also causes tube RT1 to be connected across conductors TIP1 and RING1 of channel CH1 through operated contacts R1-2 and R1-3 of relay R1. As a result of the continued application of ringing current to channel CH1 by network 101, tube RT1 is ionized and causes the ringing current applied to channel CH1 to be tripped. The tripping of ringing current in this fashion is a wellknown function in the communications art.

The aforenoted operation of relay R1A connects power supply 210 to conductor 105 through normal contact S3-6 of relay S3 and operated contact R1A-4 of relay R1A. Power supply 210, by way of conductor 105, serves as the source of power for all elements of test circuit 103. Thus, operation of relay R1A primes test circuit 103 for the performance of its input signal pattern detection functions which will be described later herein.

The aforenoted operation of relay R1A connects resistor RS1 across one winding of transformer TR1 through operated contacts R1A-2 and R1A-3 of relay R1A. When the ringing current on channel CH1 is tripped, as described above, tube T1 no longer remains ionized and relay R1 is released. The release of relay R1 disconnects tube RT1 from channel CH1 and connects channel CH1 across resistor RS1 by means of normal contacts R1-2 and R1-3 of relay R1. Thus, channel CH1 is now coupled to test circuit 103 through transformer TR1 and capacitors 301 and 302 on FIG. 3 of test channel TCH1. Input signals appearing on channel CH1 can now be monitored by test circuit 103 over test channel TCH1.

When a network connection for channel CH2 is established by network 101, ground potential is applied to its associated sleeve conductor SL2 in the well-known manner. This ground potential on conductor SL2 causes relay S2 to operate. Relay S2 will remain operated until ground potential is removed from conductor SL2 by network 101.

Upon establishment of the network connection for channel CH2, ringing current is applied to channel CH2 by network 101 in the well-known manner. This ringing current causes tube T2 to ionize, which, in turn, completes an operating path for relay R2 from the negative potential applied by network 101 to conductor RING2, through tube T2, the winding of relay R2, and operated contact S1-3 of relay S1 to ground potential. Unless relay S1 already has been operated as a result of the establishment of channel CH1, relay R2 cannot operate.

Operation of relay R2 completes an operating circuit for relay R2A which includes operated contact S2-4 of relay S2, normal contacts R2A-1 of relay R2A, and operated contact R2-1 of relay R2. Relay R2A is held in an operated condition over an obvious circuit under control of operated contact S2-4 of relay S2.

The operation of relay R2A extends ground potential through its operated contact R2A-4 over conductor 203 to test circuit 103. Application of ground potential to conductor 203 initiates the various timing functions of test circuit 103 which will be described later herein. The operation of relay R2A also connects resistor RS2 across one winding of transformer TR2 through contacts R2A-2 and R2A-3 of relay R2A.

Operation of relay R2 connects tube RT2 across conductors TIP2 and RING2 of channel CH2 through operated contacts R2-2 and R2-3 of relay R2. The ringing current applied by network 101 to channel CH2 causes tube RT2 to ionize, thereby tripping the ringing current on channel CH2 in the well-known manner.

The tripping of ringing current on channel CH2 results in the release of relay R2 since tube T2 will no longer remain ionized. Release of relay R2 disconnects tube RT2 from channel CH2 and connects channel CH2 across resistor RS2 by means of contacts R2-2 and R2-3 of relay R2. Thus, upon the operation of relay R2A and the release of relay R2, channel CH2 is coupled to test circuit 103 through transformer TR2 and capacitors 311 and 312 of test channel TCH2, over which input signals on a channel CH2 can now be monitored by test circuit 103. Loop-Around Connection Loop-around circuit 102 has now completed its functions until a loop-around enabling signal is received on conductor 104 from test circuit 103, indicating that the proper pattern of input signals on channels CH1 and CH2 has been detected. The enabling signal from test circuit 103 on conductor 104 will cause the operation of relay S3 in loop-around circuit 102. Relay S3 is then held in an operated condition through its operated contact S3-1, operated contact S2-5 of relay S2, and operated contact S1-5 of relay S1.

The operation of relay S3 establishes a loop-around connection 202 between conductor RING1 of channel CH1 and conductor RING2 of channel CH2 through operated contact S3-5 of relay S3 and capacitor RC. A similar loop-around connection 201 is established between conductor TIP1 of channel CH1 and TIP2 of channel CH2 through operated contact S3-2 of relay S3 and capacitor TC. Thus, a loop-around connection has been made between channels CH1 and CH2 by operation of relay S3. Operation of relay S3 also disconnects channel CH1 from test channel TCH1 by opening normal contact S3-2 of relay S3 and disconnects channel CH2 from test channel TCH2 by opening normal contact S3-5 of relay S3.

The operation of relay S3 returns an off-hook supervisory signal on both channels CH1 and CH2 by completing paths through inductors I1 and I2 across the respective conductors of channels CH1 and CH2 through operated contacts S3-4 and S3-3 of relay S3. Such supervisory signals can be used to initiate customer charging for the use of the communication channels, as is well known in the communications art.

Operation of relay S3 disconnects power supply 210 from conductor 105 by opening its normal contact S3-6. Removal of power from conductor 105 disables all elements of test circuit 103, thereby returning test circuit 103 to a quiescent state.

Disconnect Operation

When the connection through network 101 for either of the channels CH1 or CH2 is released by network 101, ground potential is removed from the associated sleeve conductor SL1 or SL2 in the well-known manner. Removal of ground potential from conductor SL1 will cause the release of relay S1. Removal of ground potential from conductor SL2 will cause the release of S2. The release of either of the relays S1 or S2 will open the above-described holding circuit for relay S3, thereby causing the release of relay S3 and the resulting release of the loop-around connection 201, 202 between channels Ch1 and Ch2.

The release of relay S1 opens the above-described holding circuit for relay R1A at contact S1-4, thereby releasing relay R1A. The release of relay S2 opens the holding circuit for relay R2A at contact S1-4, thereby releasing relay R2A. The release of relays R1A, R2A and S3 returns loop-around circuit 102 to a quiescent state.

Test Circuit 103

Figures 3, 4:
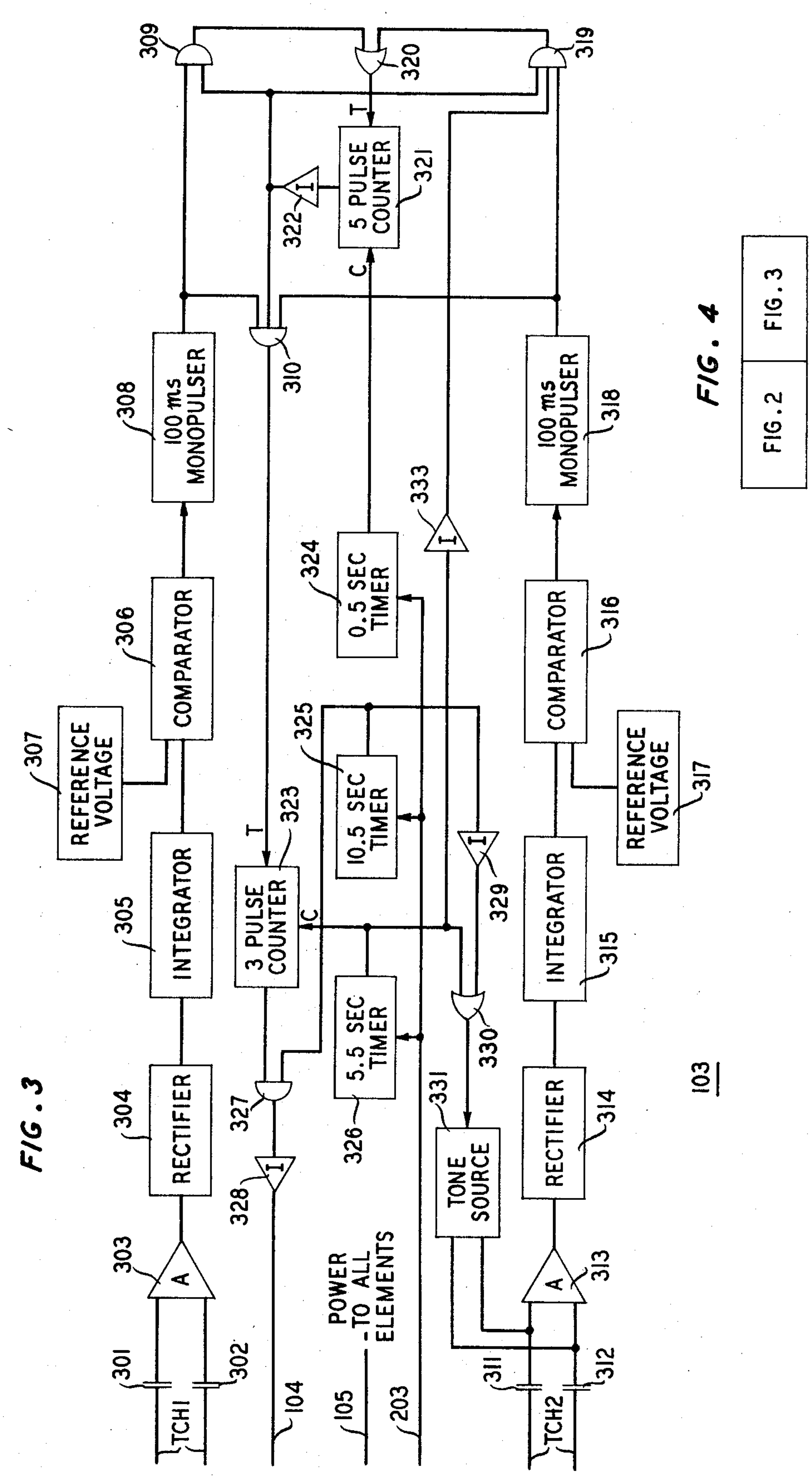
FIG. 3 is a block diagram representation of an illustrative signal pattern test circuit.
FIG. 4 is a key diagram illustrating the manner in which FIGS. 2 and 3 should be arranged.

FIG. 3 illustrates the circuit element organization of test circuit 103 in block diagram form using standard logic symbols and circuit element designations. The specific circuit details of such elements are well known in the electronics art and description thereof is not necessary for a complete understanding of our invention.

As described above, connection of power supply 210 to conductor 105 supplies power to all elements of test circuit 103. The various connections of conductor 105 to each of the elements on FIG. 3 are implied but not shown in FIG. 3. As described above, power supply 210 is connected to conductor 105 at the time channel CH1 is coupled to channel TCH1 for monitoring by test circuit 103.

As described above, application of ground potential to conductor 203 initiates the timing functions of test circuit 103. Ground potential is applied to conductor 203 at the time channel CH2 is coupled to test channel TCH2 for monitoring by test circuit 103. The ground potential on conductor 203 is applied concurrently to timers 324, 325, and 326.

Timer 324, when started by ground potential on conductor 203, provides an output pulse lasting for 0.5 seconds which causes pulse counter 321 to be reset. Counter 321 remains reset for 0.5 seconds.

Timer 326, responsive to ground potential on conductor 203, provides a 5.5 second output pulse. This output pulse resets pulse counter 323 and maintains it in a reset condition for the 5.5 second duration of the output pulse.

The 5.5 second output pulse from timer 326 also is applied through OR gate 330 as an enabling signal to tone source 331. Tone source 331, while thus enabled, applies an alerting signal to test channel TCH2 which is transmitted back through loop-around circuit 102 and over channel CH2 to station 2. This signal serves as an indication to station 2 that test circuit 103 is connected and will start monitoring for occurrences of simultaneous input signals on channels CH1 and CH2 when the alerting signal is removed 5.5 seconds later.

The 5.5 second output pulse from timer 326 also is applied to inverter 333 which, in turn, provides an inhibiting signal to AND gate 319 for the duration of the 5.5 second output pulse. The function of AND gate 319 and the reason for so inhibiting it for this time period will be described later herein.

Timer 325, upon its being started by ground potential over conductor 203, provides a 10.5 second output pulse. This 10.5 second pulse is applied as an enabling signal to AND gate 327, whose function will be described later herein.

The 10.5 second pulse from timer 325 is inverted by inverter 329 and applied to OR gate 330. Thus, when the 10.5 second pulse ceases, an enabling signal is provided by inverter 329 through OR gate 330 to tone source 331. As described above, tone source 331, when so enabled, returns an alerting signal to station 2. However, in this instance, return of an alerting signal to station 2 serves as an indication that the proper number of simultaneous signal occurrences has not been detected on channels CH1 and CH2 and that no loop-around connection will be established.

Input Signal Detection

It will be seen from the following description that the five second time period between the end of the 5.5 second output pulse from timer 326 and the end of the 10.5 second output pulse from timer 325 is a window during which three occurrences of substantially simultaneous input signals on channels CH1 and CH2 must be detected and counted by test circuit 103 before a loop-around enabling signal is sent to loop-around circuit 102. In this illustrative embodiment, the simultaneous input signals to which test circuit 103 responds are provided by stations 1 and 2 as a result of a person speaking a series of three single syllable words, such as "five"-"five"-"five," simultaneously into the transducer elements of both stations 1 and 2.

Audio input signals on channel CH1 are coupled through test channel TCH1 to amplifier 303. Each audio signal is amplified by amplifier 303, rectified by rectifier 304 and integrated by integrator 305. The output signal from integrator 305 is compared by comparator 306 with a D.C. reference voltage source 307. If the proper relationship exists between the output signal from integrator 305 and reference voltage 307, comparator 306 provides a trigger pulse to monopulser 308. In response to the trigger pulse, monopulser 308 provides a 100 millisecond output pulse.

Audio input signals appearing on channel CH2 are operated upon in a similar manner to those appearing on channel CH1 as described above. Each audio input signal on channel CH2 is treated by amplifier 313, rectifier 314, integrator 315 and comparator 316 in the same manner that audio input signals on channel CH1 are treated by the corresponding test circuit elements associated with channel CH1. Thus, in response to each audio input signal on channel CH2, monopulser 318 provides a 100 millisecond output pulse.

Signal Pattern Test Operations

In this one illustrative embodiment of our invention, the input signal pattern, for which test circuit 103 checks, comprises a series of three occurrences of substantially simultaneous input signals on both channels CH1 and CH2 which must occur within a specific time interval. Test circuit 103 monitors channel CH1 for input signals for a ten second time period defined by the end of the 0.5 second output pulse from timer 324 and the end of the 10.5 second output pulse from timer 325.

Test circuit 103 monitors both channels CH1 and CH2 for input signals only during the five second time period defined by the end of the 5.5 second output pulse from timer 326 and the end of the 10.5 second output pulse from timer 325. During this latter five second time period, input signals occurring simultaneously on both channels are counted as a single input signal. If, within the time intervals during which channels CH1 and CH2 are monitored by test circuit 103, a total of five input signals are counted on either channel CH1 or CH2 without counting three occurrences of simultaneous input signals on both channels CH1 and CH2, test circuit 103 will not provide a loop-around enabling signal to loop-around circuit 102.

Pulse counter 321 is arranged to provide an output signal when it has counted five input signals on either of the channels CH1 or CH2. Signals detected on both channels CH1 and CH2 simultaneously are counted as a single input signal by counter 321. Counter 321 is reset by the 0.5 second output pulse from timer 324. The output condition of counter 321 is applied to and is inverted by inverter 322. Thus, when no output signal is provided by counter 321, inverter 322 provides an enabling signal to AND gates 309, 310, and 319. AND gate 309, when so enabled, transmits each 100 millisecond output pulse from monopulser 308 through OR gate 320 as a toggle pulse to counter 321. Thus, until pulse counter 321 provides an output signal as the result of its having counted five toggle pulses, each input signal received on channel CH1 will result in the advancing of pulse counter 321. As noted above, the counting of input signals on channel CH1 by counter 321 commences at the end of the 0.5 second output signal from timer 324.

As noted earlier herein, the 5.5 second output pulse from timer 326 is applied to inverter 333. As a result, inverter 333 applies an inhibiting signal to AND gate 319 for the duration of the 5.5 second output pulse from timer 326. This inhibiting of AND gate 319 prevents any counting by counter 321 of input signals on channel CH2 until the inhibiting signal is removed. As noted above, the inverted output of pulse counter 321 is applied as an enabling signal to AND gate 319. The third input to AND gate 319 is enabled responsive to each 100 millisecond output pulse from monopulser 318. Thus, in the absence of an output signal from counter 321 and upon the ending of the 5.5 second output pulse from timer 326, each input signal on channel CH2 causing an output pulse from monopulser 318 results in the transmission of a pulse through AND gate 319 and OR gate 320 to toggle counter 321.

As a result of the above-described operations, pulse counter 321 counts each input signal received on channel CH1 for a time period beginning 0.5 seconds after the initiation of timing in test circuit 103 and counts each input signal on either channel CH2 or channel CH1 for a time period beginning 5.5 seconds after the start of timing in test circuit 103. During the latter time period, overlapping 100 millisecond pulses from both monopulsers 308 and 318 result in application of a single toggle pulse to counter 321 and are counted as a single pulse. As will be described below, when counter 321 has counted five pulses, an output signal is supplied from counter 321 which inhibits all further counting of input signals by test circuit 103. Inhibiting of input signal counting precludes test circuit 103 from providing a loop-around enabling signal to loop-around circuit 102 unless three occurrences of simultaneous input signals on both channels have been counted, as described below.

Detection of occurrence of substantially simultaneous input signals on both channels CH1 and CH2 is accomplished by AND gate 310. AND gate 310 provides a toggle pulse to pulse counter 323 whenever the 100 millisecond output pulses from monopulsers 308 and 318 overlap and no inhibiting signal is being provided from inverter 322. The 100 millisecond pulse width provided by the monopulsers 308 and 318 allows for possible differences between the transmission characteristics of channels CH1 and CH2. Such transmission characteristic differences might preclude exact equality of transmission times for signals transmitted simultaneously from stations 1 and 2. Thus, any input signal overlap occurring within a 100 millisecond time period will satisfy the simultaneous signal counting functions of test circuit 103.

Each output pulse from AND gate 310 represents a detected occurrence of substantially simultaneous input signals on both channels CH1 and CH2, and toggles pulse counter 323, causing its count to be advanced. When pulse counter 323 has counted three toggle pulses from AND gate 310, an output signal is supplied by counter 323 to AND gate 327. As described earlier herein, AND gate 327 is enabled for a 10.5 second interval after initiation of timing in test circuit 103 under the control of the 10.5 second output pulse supplied by timer 325. Thus, if pulse counter 323 provides an output signal during the 10.5 second time interval defined by timer 325, AND gate 327 provides an output signal to inverter 328. The inverted output signal from AND gate 327 is applied over conductor 104 as operating potential for relay S3 in loop-around circuit 102. Thus, this signal on conductor 104 serves as a loop-around enabling signal resulting in the establishment of a loop-around connection by loop-around circuit 102 between channels CH1 and CH2, as previously described.

As noted above, the enabling signal for AND gate 327 from timer 325 is removed upon the elapse of 10.5 seconds after the initiating of timing in test circuit 103. Thus, after this time period has elapsed, no loop-around enabling signal can be supplied over conductor 104 to loop-around circuit 102. At the end of the 10.5 second time period, if no loop-around enabling signal has been supplied, an alerting signal again is transmitted by tone source 331 back to station 2 over test channel TCH2 and channel CH2, as described earlier herein. If, however, relay S3 in loop-around circuit 102 has been operated as the result of a loop-around enabling signal, all power is removed from the elements of test circuit 103 by opening the circuit of conductor 105 at normal contact S3-6 of relay S3. Therefore, if relay S3 has been operated, no alerting signal will be returned to station 2.

In summary of the above operations, pulse counter 321 is arranged by means of AND gate 309 and timer 324 to count each input signal on channel CH1 for a time interval starting 0.5 seconds after timing is initiated in test circuit 103, and is arranged by means of AND gate 319 and timer 326 to count input signals on channel CH2 for a time interval beginning 5.5 seconds after initiation of timing in test circuit 103. During the latter time interval, signals occurring simultaneously on both channels CH1 and CH2 are counted as a single input signal. Pulse counter 323 is arranged by means of timer 326 to count occurrences of substantially simultaneous input signals on both channels CH1 and CH2 only during a time interval starting 5.5 seconds after initiation of timing in test circuit 103. If three occurrences of simultaneous input signals are counted by counter 323 before 10.5 seconds have elapsed after the initiation of timing in test circuit 103, a loop-around enabling signal is provided by AND gate 327 through inverter 328 over conductor 104. However, if five input signals are counted by counter 321 on either channel CH1 or CH2, further counting of simultaneous input pulse occurrences by counter 323 is inhibited. Thus, from a customer's standpoint, in order to initiate the establishment of a loop-around connection between channels CH1 and CH2, three sets of signals must be transmitted from both stations 1 and 2 simultaneously within a 5 second time period, the start of which is indicated by the cessation of an alerting signal on channel CH2 and the end of which is defined by the return of the alerting signal on channel CH2.

What is claimed is:

1. In a communication system,
a first communication channel,
a second communication channel,
connecting means operative to interconnect said first and second channels,
detecting means for detecting only an occurrence of the same predetermined sequence of input signals on both said first and second channels, and
enabling means controlled by said detecting means for enabling operation of said connecting means.

2. In a communication system, the combination of claim 1 further comprising
means for controlling said detecting means to detect said predetermined sequence pulses only when said occurrence thereof is substantially simultaneous on both said channels.

3. In a communication system,
a first communication channel,
a second communication channel,
connecting means operative to interconnect said first and second channels,
detecting means comprising first counting means for counting the number of occurrences of substantially simultaneous input signals on both of said channels, and
enabling means controlled by said first counting means for enabling operation of said connecting means only after a first predetermined number of said occurrences of substantially simultaneous input signals on both said channels has been counted by said first counting means.

4. In a communication system, the combination of claim 3 wherein said detecting means further comprises second counting means for counting the number of input signals on either of said channels, each occurrence of substantially simultaneous input signals on both said channels being counted as a single input signal by said second counting means, and second inhibiting means controlled by said second counting means for inhibiting said first counting means when the number of said input signals on either of said channels counted by said second counting means exceeds a predetermined limit.

5. In a communication system, the combination of claim 4 further comprising first timing means for measuring a first predetermined time interval following a start signal associated with one of said channels, and first inhibiting means controlled by said first timing means for inhibiting said enabling means upon expiration of said first predetermined time interval.

6. In a communication system, the combination of claim 5 further comprising second timing means for measuring a second predetermined time interval following said start signal, said second predetermined time interval being shorter than said first predetermined time interval, and said first counting means being controlled by said second timing means to start counting said occurrences of substantially simultaneous input signals on both said channels upon expiration of said second predetermined time interval.

7. In a communication system, the combination of claim 6 further comprising signaling means controlled by said second timing means for transmitting an alerting signal on said one of said channels during said second predetermined time interval.

8. In a communication system, the combination of claim 7 wherein said signaling means is controlled by said first timing means to transmit an alerting signal on said one of said channels upon expiration of said first predetermined time interval, and further comprising means controlled by said enabling means for disabling said signaling means and said first timing means upon enablement of said connecting means.

9. In a communication system, the combination of claim 6 wherein said second counting means is controlled by said second timing means to count input signals on said one of said channels only upon expiration of said second time interval and is controlled by said first timing means to count input signals on the other of said channels during said first time interval.

10. In a communication system, the combination of claim 5 further comprising means for each of said channels for establishing a test connection therefrom to said detecting means, and means controlled by said enabling means for opening said test connections.

11. In a communication system, the combination of claim 10 wherein said start signal is generated by said test connection establishing means for said one of said channels.

12. In a communication system, the combination of claim 10 further comprising first and second communication stations respectively connected to said first and second channels, a switching system for establishing said first and second channels by means of switching network connections between said stations and said connecting means, and wherein said test connection establishing means is enabled responsive to the establishment of a switching network connection by said switching system to said connecting means.

13. In a communication system, the combination of claim 12 wherein each of said communication stations comprises a transducer element, and said occurrences of substantially simultaneous input signals on both said channels occur in response to simultaneous applications of sound to said transducer elements of both said stations.

14. In a communication system, a first communication channel termination, a second communication channel termination, connecting means operative to interconnect said terminations, timing means responsive to connection request conditions at both said terminations for defining a predetermined interval of time, first counting means for counting each occurrence of simultaneous signals on both said terminations, signals separated by less than a specified amount of time being counted as an occurrence of simultaneous signals, and control means controlled by said timing means and said first counting means for operating said connecting means only in response to a predetermined number of said occurrences of simultaneous signals on both said terminations within said predetermined interval of time.

15. In a communication system, the combination of claim 14 further comprising test connection means responsive to said connection request conditions for establishing test connections from both of said terminations to said counting means, and start means for starting said timing means when both of said test connections are established, and wherein said timing means comprises a first timer for defining the start of said predetermined interval of time upon the elapsing of a first time period after the starting of said timing means, and a second timer for defining the end of said predetermined interval of time upon the elapsing of a second time period after the starting of said timing means.

16. In a communication system, the combination of claim 15 further comprising second counting means controlled by said timing means for counting each occurrence of a signal on only one of said terminations during said first time period and for counting each occurrence of a signal on either of said terminations during said predetermined interval of time, each occurrence of simultaneous signals on both said terminations during said predetermined interval of time being counted by said second counting means as a single signal occurrence, and means controlled by said second counting means for inhibiting said first counting means when the number of signal occurrences counted by said second counting means exceeds a predetermined limit.

17. In a communication system, the combination of claim 16 further comprising signaling means controlled by said timing means for applying a signal to one of said terminations during said first time period and upon the elapsing of said second time period, and means controlled by said control means for disabling said timing means and said signaling means when said connecting means is operated.

* * * * *